United States Patent
Ganesan et al.

(10) Patent No.: US 12,047,490 B2
(45) Date of Patent: Jul. 23, 2024

(54) LENGTH-PRESERVING ENCRYPTION FOR DATABASE TABLES

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: Oracle International Corporation, Redwood Shores, CA (US)

(*) Notice: Subject to any disclaimer, the term of this patent is extended or adjusted under 35 U.S.C. 154(b) by 410 days.

(21) Appl. No.: 17/452,116

(22) Filed: Oct. 25, 2021

(65) Prior Publication Data
US 2023/0128699 A1 Apr. 27, 2023

(51) Int. Cl.
  *H04L 29/06* (2006.01)
  *G06F 16/22* (2019.01)
  *H04L 9/06* (2006.01)

(52) U.S. Cl.
  CPC ........ *H04L 9/0637* (2013.01); *G06F 16/2282* (2019.01); *H04L 9/0631* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 5,673,319 A | * | 9/1997 | Bellare | H04L 9/0643 380/37 |
| 10,140,370 B1 | | 11/2018 | Zhang et al. | |
| 2010/0153748 A1 | * | 6/2010 | Valfridsson | G06F 21/6227 713/193 |
| 2022/0417029 A1 | * | 12/2022 | Brown | H04L 9/3066 |

FOREIGN PATENT DOCUMENTS

CN 104657413 B * 2/2019 .......... G06F 16/951

OTHER PUBLICATIONS

Dworkin, "Block Cipher Techniques," Information Technology Laboratory—Computer Security Resource Center (CSRC), Created: 2017, Updated 2020, retrieved: https://csrc.nist.gov/projects/block-cipher-techniques/bcm/current-modes, pp. 1-5.

Dworkin, "Recommendation for Block Cipher Modes of Operation: Methods for Format-Preserving Encryption," NIST—National Institute of Standards and Technology, 2016, pp. 1-28, Department of Commerce, Washington, DC.

(Continued)

*Primary Examiner* — Andrew J Steinle
(74) *Attorney, Agent, or Firm* — Potomac Law Group, PLLC

(57) ABSTRACT

Embodiments are directed to encrypting data of a database table. Embodiments receive the database table, the database table including a plurality of rows, each row including a unique primary key and at least one column of unencrypted data. Embodiments convert each unique primary key into a unique initialization vector ("IV"). For a current row, embodiments encrypt the unencrypted data using a corresponding unique IV for the row, the encrypting including length-preserving encryption. Within each column, embodiments replace the unencrypted data with the encrypted data.

20 Claims, 5 Drawing Sheets

(56) References Cited

OTHER PUBLICATIONS

Perez-Resa, et al., "A New Method for Format Preserving Encryption in High-Data Rate Communications," IEEE Access, 2020, vol. 8, pp. 21003-21016.

Rogaway, "A Synopsis of Format-Preserving Encryption," Paper from University of California, 2010, retrieved from: https://www.cs.ucdavis.edu/~rogaway/papers/synopsis.pdf, pp. 1-18.

Unknown, "Format-preserving encryption," Wikipedia, Jul. 2021, pp. 1-8, retrieved from: https://en.wikipedia.org/wiki/Format-preserving_encryption.

Unknown, "Voltage SecureData," Micro Focus—Government Solutions, 2019, pp. 1-8, retrieved from:https://www.microfocus.com/media/data-sheet/voltage_securedata_ds.pdf.

\* cited by examiner ically to data encryption of database tables.

LENGTH-PRESERVING ENCRYPTION FOR DATABASE TABLES

FIELD

One embodiment is directed generally to data encryption, and in particular to data encryption of database tables.

BACKGROUND INFORMATION

In cryptography, ciphertext is the result of encryption performed on plaintext using an algorithm, referred to as a "cipher". Ciphertext is also known as encrypted or encoded information because it includes a form of the original plaintext that is unreadable by a human or computer without the proper cipher to decrypt it. Decryption, the inverse of encryption, is the process of turning ciphertext into readable plaintext.

In "symmetric" cryptography, a block cipher is an algorithm that encrypts a finite size block of plaintext message using a secret symmetric key. For example, the Advanced Encryption Standard ("AES") algorithm encrypts only 128-bit (or 16 bytes) of data, while the Data Encryption Standard ("DES") algorithm encrypts only 64-bit (or 8 bytes) of data. In order to encrypt messages that are longer than the block length of the selected block cipher algorithm, several known block cipher modes can be used. For example, the Counter Mode ("CTR") and the Galois Counter Mode ("GCM"), among others, can be used to encrypt a large volume of data. In general, the block cipher modes divide the plaintext message into one or more blocks and introduce randomness using a random number, referred to as the initialization vector ("IV"). The IV helps in hiding the patterns, if any, about the underlying plaintext messages that are encrypted.

A well-known precondition when using the CTR/GCM modes is that the (IV, Key) pair should be unique for each message. The same precondition is applicable to the known one-time pad ("OTP") algorithm, which is an encryption technique that cannot be cracked, but requires the use of a one-time pre-shared key the same size as, or longer than, the message being sent. For these encryption techniques, if this precondition is violated, a cryptanalyst or illicit party may be able to derive the list of messages that were encrypted using the same (IV, Key) pair.

Further, within cryptography there may be a need for format-preserving encryption ("FPE"), which refers to encrypting in such a way that the output (the ciphertext) is in the same format as the input (the plaintext). The format that is preserved may vary. Typically only finite sets of characters are used; numeric, alphabetic or alphanumeric. Examples of FPE include encrypting a 16-digit credit card number so that the ciphertext is another 16-digit number, encrypting an English word so that the ciphertext is another English word, and encrypting an n-bit number so that the ciphertext is another n-bit number (i.e., the definition of an n-bit block cipher).

SUMMARY

Embodiments are directed to encrypting data of a database table. Embodiments receive the database table, the database table including a plurality of rows, each row including a unique primary key and at least one column of unencrypted data. Embodiments convert each unique primary key into a unique initialization vector ("IV"). For a current row, embodiments encrypt the unencrypted data using a corresponding unique IV for the row, the encrypting including length-preserving encryption. Within each column, embodiments replace the unencrypted data with the encrypted data.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

Embodiments perform length-preserving encryption on database table data by using database table primary keys as initialization vectors. Because database schemas typically limits an amount of characters in database tables, embodiment allow the length-preserved encrypted data to be stored in the same database tables.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
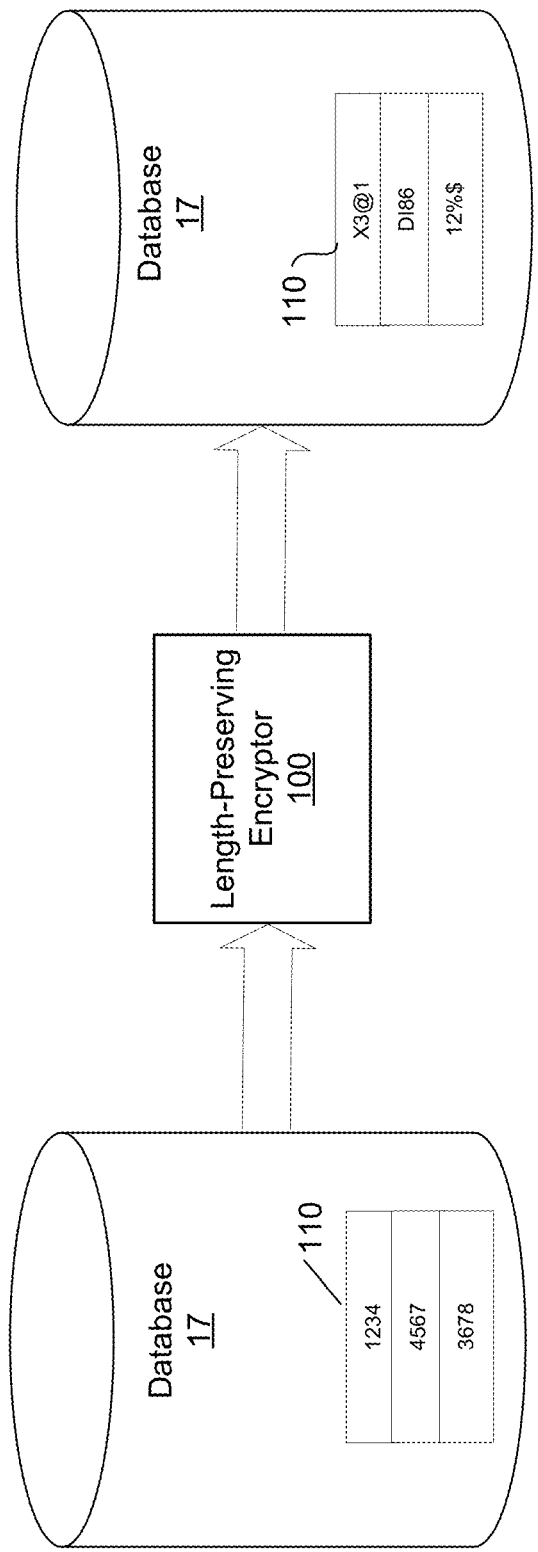
FIG. 1 is an overview diagram of a length-preserving encryption system in accordance to embodiments.

FIG. 1 is an overview diagram of a length-preserving encryption system in accordance to embodiments. As shown in FIG. 1, a database 17 (e.g., a relational database) includes one or more database tables 110 that include non-encrypted data. A length-preserving encryptor 110 encrypts the data in database tables 110, so that, a shown, the data in database tables 110 is now encrypted but maintains the same length as the original data, which is generally a requirement for storing data in database tables 110 per the relevant database schema.

In one embodiment, database 17 is implemented with the relational database management system ("RDMS") database from Oracle Corp. In the context of Oracle databases, a schema object is a logical data storage structure. An Oracle database associates a separate schema with each database user. A schema comprises a collection of schema objects. Examples of schema objects include: tables, views, sequences, synonyms, indexes, clusters, database links, snapshots, procedures, functions or packages. On the other hand, non-schema objects may include: users, roles, contexts or directory objects.

Schema objects do not have a one-to-one correspondence to physical files on disk that store their information. However, Oracle databases store schema objects logically within a tablespace of the database. The data of each object is physically contained in one or more of the tablespace's data files. For some objects, such as tables, indexes, and clusters, a database administrator can specify how much disk space the Oracle RDBMS allocates for the object within the tablespace's data files. There is no necessary relationship between schemas and tablespaces. A tablespace can contain objects from different schemas, and the objects for a single schema can reside in different tablespaces.

Figure 2:
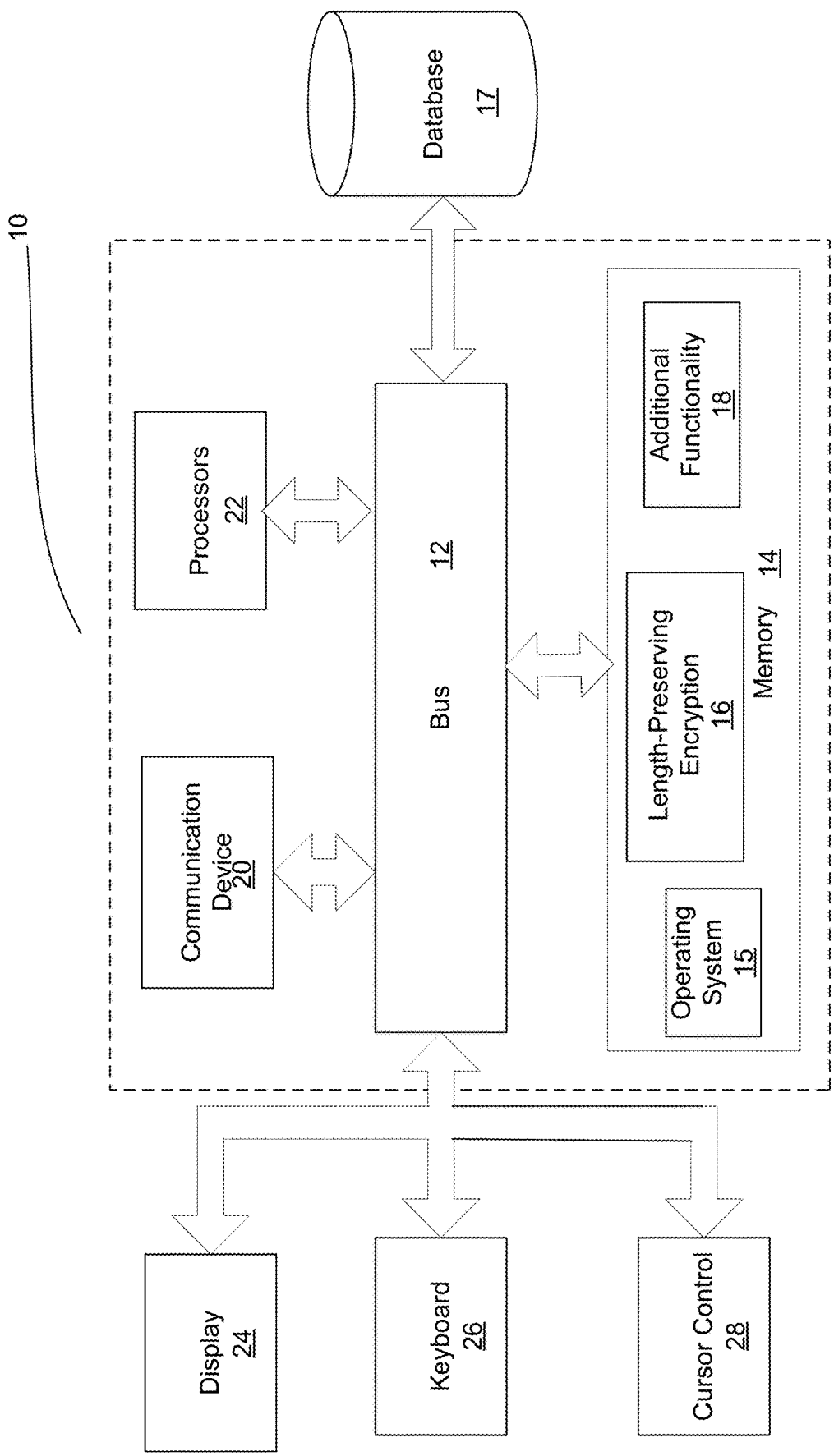
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a length-preserving encryption module 16 that encrypts database table data while preserving the length, and all other functionality disclosed herein. System 10 can be part of a larger system. Therefore, system 10 can include one or more additional functional modules 18 to include the additional functionality that can utilize encryption/decryption functionality. For example, when a web browser connects to a hotel registration site, it uses modern ciphers such as AES in the GCM or CTR mode, and modules 18 can include the hotel functionality that has a need for encryption/decryption functionality disclosed herein and implemented by module 16. A file storage device or database 17 is coupled to bus 12 to provide centralized storage for modules 16 and 18, including the unencrypted and then encrypted database tables. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Known solutions generally can provide length-preserving encryption. For example, the Advanced Encryption Standard ("AES") algorithm is an encryption algorithm that maps a 16-byte (i.e., 128 binary bits) plaintext into a 16-byte ciphertext using a given secret key k. However, when encrypting database tables in accordance to a given database schema, the schema typically imposes a length-preserving constraint in that the database schema and other data structures cannot be modified to store the ciphertext and the associated "non-secret" data (e.g., initialization vectors, tweaks, etc.) in addition to the encrypted data. Therefore, if there is a need to encrypt, for example, a 10-byte (i.e., 80 binary bits) sensitive data using the AES algorithm but with the additional constraint that the output ciphertext needs to also be 10-bytes, merely using the AES algorithm would require additional storage. For example, using the AES algorithm to encrypt a database table, an additional column would have to be added to the database table to accommodate the storage of the initialization vectors ("IV"s).

Specifically, known format-preserving encryption algorithms apply AES (or equivalent ciphers) numerous times using the Feistel network structure. A Feistel network structure is a framework for constructing an encryption mode. The framework consists of several iterations, called rounds, in which a keyed function, called the round function, is applied to one part of the data in order to modify the other part of the data. The roles of the two parts are swapped for the next round.

For example, the National Institute of Standards and Technology ("NIST") has approved two FPE modes, referred to as "FF1" and "FF3", each of which employ the Feistel structure. At the core of FF1 and FF3 are somewhat different Feistel round functions that are derived from an approved block cipher with 128-bit blocks (i.e., the AES algorithm).

Each of these FPE modes fits within a larger framework, referred to as "FFX", for constructing FPE mechanisms. The "X" indicates the flexibility to instantiate the framework with different parameter sets. The FF1 algorithm invokes the AES algorithm 10 times, one for each round of the Feistel network, which creates inefficiencies. In addition to the formatted data for which the modes provide confidentiality, each mode also takes an additional input, referred to as a "tweak", which is not necessarily secret. The tweak can be regarded as a changeable part of the key, because together they determine the encryption and decryption functions. However, the tweaks have to be stored to securely use FF1 and FF3, although tweaks are optional but are highly recommended to prevent against a chosen-plaintext attack.

In addition, many vendors (e.g., Oracle, Microsoft) support transparent data encryption ("TDE"). TDE performs real-time I/O encryption and decryption of data and log files. The encryption uses a database encryption key ("DEK"). The database boot record stores the key for availability during recovery. The DEK is a symmetric key that is secured by a certificate that the server's master database stores or by an asymmetric key that an EKM module protects. TDE protects data at rest, which is the data and log files. With TDE, encryption of a database file is done at the page level. The pages in an encrypted database are encrypted before they are written to disk and are decrypted when read into memory. TDE does not increase the size of the encrypted database. However, TDEs may not be suitable for all legacy environments. In some contexts, in addition to TDE, applications would prefer to have their own encryption in place as a defense-in-depth strategy for security. However, in contrast to embodiments of the invention, TDEs expand the size of the filesystem to accommodate encryption.

In contrast to known encryption schemes, such as FF1, FF3, TDE, etc., embodiments utilize the fact that database tables have primary keys that can be used as initialization vectors ("IV"s), which need not be random for the counter mode ("CTR") of encryption. In general, the CTR mode only requires a unique IV for encrypting (and decrypting) one block of data. Randomness of IVs is not a requirement. However, as discussed above, legacy applications may not be able to modify the existing database schema to store IVs, nonce, etc. Therefore, embodiments leverage the primary keys of the database tables as the IV in the encryption scheme. Since the primary key is unique for each database record, each primary key is converted into an IV. Embodiments then use the CTR mode for encryption. Because the CTR mode is a stream cipher, it achieves the goal of preserving the length.

Further, in contrast to known encryption schemes, such as FF1, FF3, TDE, etc., embodiments leverage the CTR mode but do not store the IVs explicitly because the primary keys are treated as IVs. Further, embodiments apply the block cipher algorithm (e.g., AES or any other equivalent algorithms) only once for each block, in contrast to, for example, FF1 and FF3. Therefore, in contrast to known solutions, embodiments are more efficient in terms of both needed memory requirements and time requirements while achieving length-preserving encryption, thus improving the performance of the computer that is implementing the encryption.

Specifically, most known format-preserving encryption ("FPE") approaches are deterministic, so that if the same plaintext is encrypted again, the output ciphertext does not change. Therefore, these known solutions are not secure against a chosen-plaintext attack. Further, as discussed, in known FFX-based solutions such as FF1 and FF2, tweaks are used to handle this information leakage. However, tweaks have to be stored, meaning that the existing database schema has to be modified. As disclosed, changing the schema is not desirable, particularly for many legacy systems.

In contrast, embodiments use the CTR mode of block cipher encryption to achieve security against chosen-plaintext attack as well as length-preserving encryption. Embodiments do not require counter values (i.e., IVs) to be stored for successful encryption and decryption. Embodiments do not store the counter values because embodiments use the primary keys of database tables as unique counters. Other known solutions require a modification of the existing CTR mode in order to be implemented, meaning the modified CTR mode needs to be secure. In contrast, embodiments do not modify the existing CTR mode design, so already approved and well-tested cryptographic packages that implement the CTR mode can be used with embodiments.

Since a block cipher can encrypt only a fixed size of data, block ciphers modes are used to encrypt a volume of data. Block cipher modes partition the input data into multiple blocks which can be encrypted using block cipher algorithms. Further, many block cipher modes help introduce randomness to hide patterns in the plaintext. For example, if the first block of data and the last block are the same, this pattern can be hidden from the "enemy" with the help of a block cipher mode.

XOR is a binary operator that takes two bits as the input and outputs one bit. As shown in Table 1 below, x and k are input operands and y is the output. XOR of two bytes p and q (a byte is usually comprised of 8 bits) is defined by computing the XOR of each bit of p with the corresponding bit of q. An example of how to calculate the XOR of two bytes is given below. The XOR operator can be represented using '^'.

TABLE 1

| x | k | y = x $\oplus$ k |
|---|---|---|
| 0 | 0 | 0 |
| 0 | 1 | 1 |
| 1 | 0 | 1 |
| 1 | 1 | 0 |

Figure 3A:
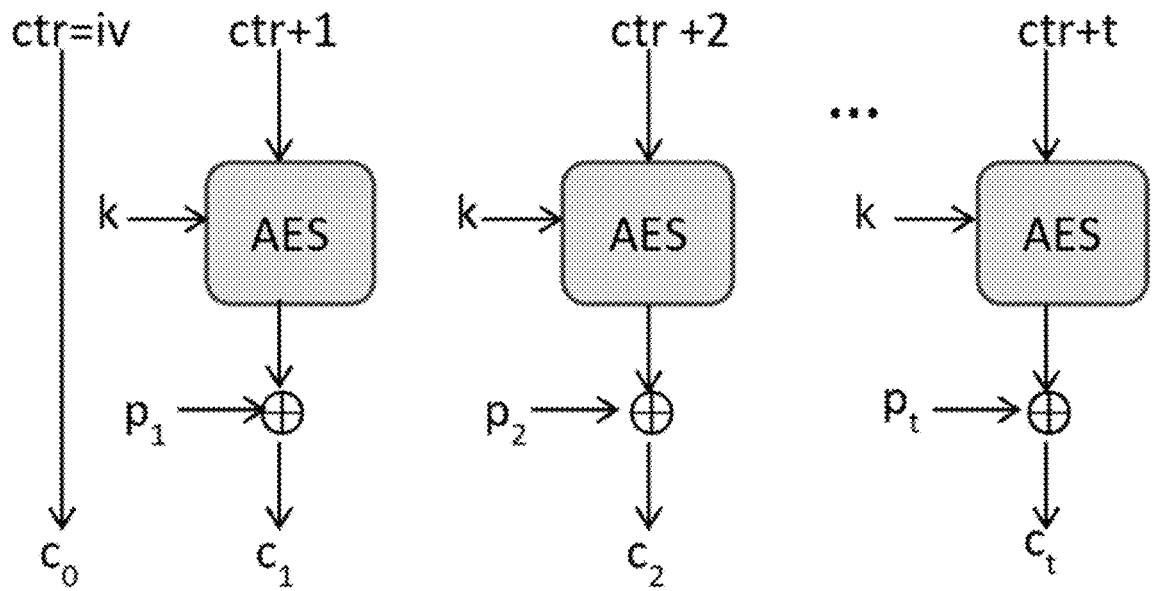
FIGS. 3A and 3B illustrate how the IV (also referred to as a "nonce") is used in two specific block ciphers modes, CTR and GCM.
Figure 3B:
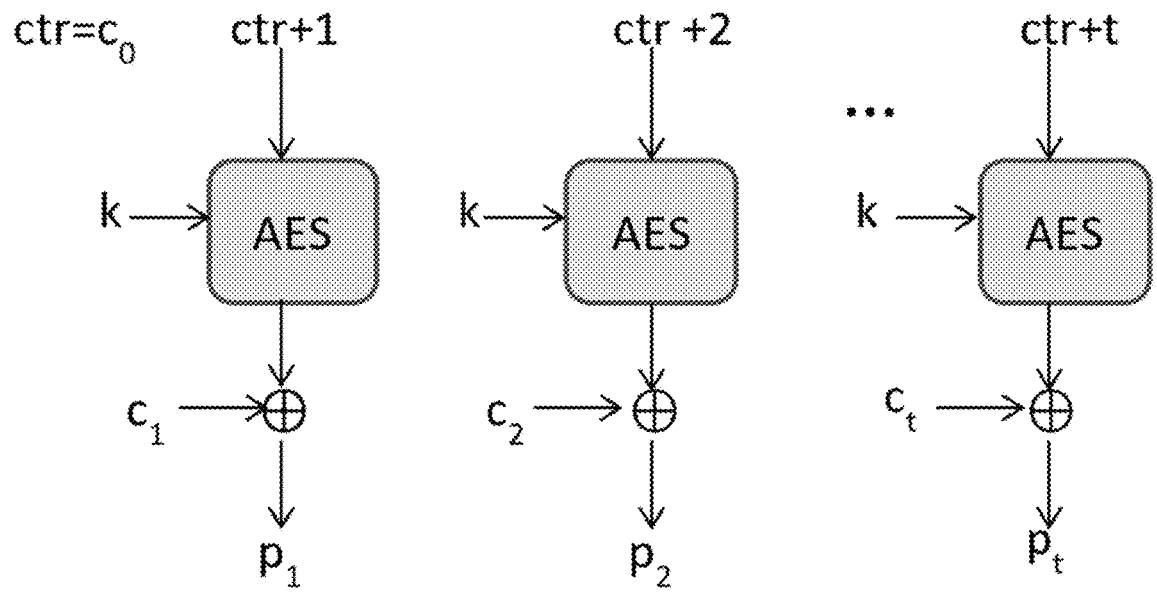

FIGS. 3A and 3B illustrate how the IV (also referred to as a "nonce") is used in two specific block ciphers modes, CTR and GCM.

FIG. 3A illustrates how the CTR mode can be instantiated to encrypt a plaintext made of t blocks ($p_1, p_2, \ldots, p_t$). The counter value is initialized by the IV, which is a unique but not necessary random number. AES-CTR mode means that the AES cipher is used to encrypt the input counter with a secret symmetric key k. The output of the AES is used as the key stream to encrypt each block of plaintext. As shown in FIG. 3A, in the CTR mode, the IV is used to derive the key stream. Unique key streams are generated for each plaintext block by encrypting the counter value using a key. The counter value is simply incremented by one and then the block cipher (e.g., AES) is called to generate a key stream.

FIG. 3B illustrate the decryption process in the CTR mode. The initialization vector is nothing but the first ciphertext block co. The key stream is derived using the same encryption key k which was used during the encryption process. In order to decrypt the ciphertext, which is made of t+1 blocks ($c_0, c_1, c_2, \ldots, c_t$), each ciphertext block is xor-ed with the key stream. Thus, the output of the decryption process is the plaintext blocks ($p_1, p_2, \ldots, p_t$).

As disclosed, the CTR mode preserves the length because the ciphertext is obtained from the plaintext using the XOR operator, which preserves the length by definition. Further, with CTR, the counter value need not be random as long the each block is encrypted using unique counter values.

Figure 4:
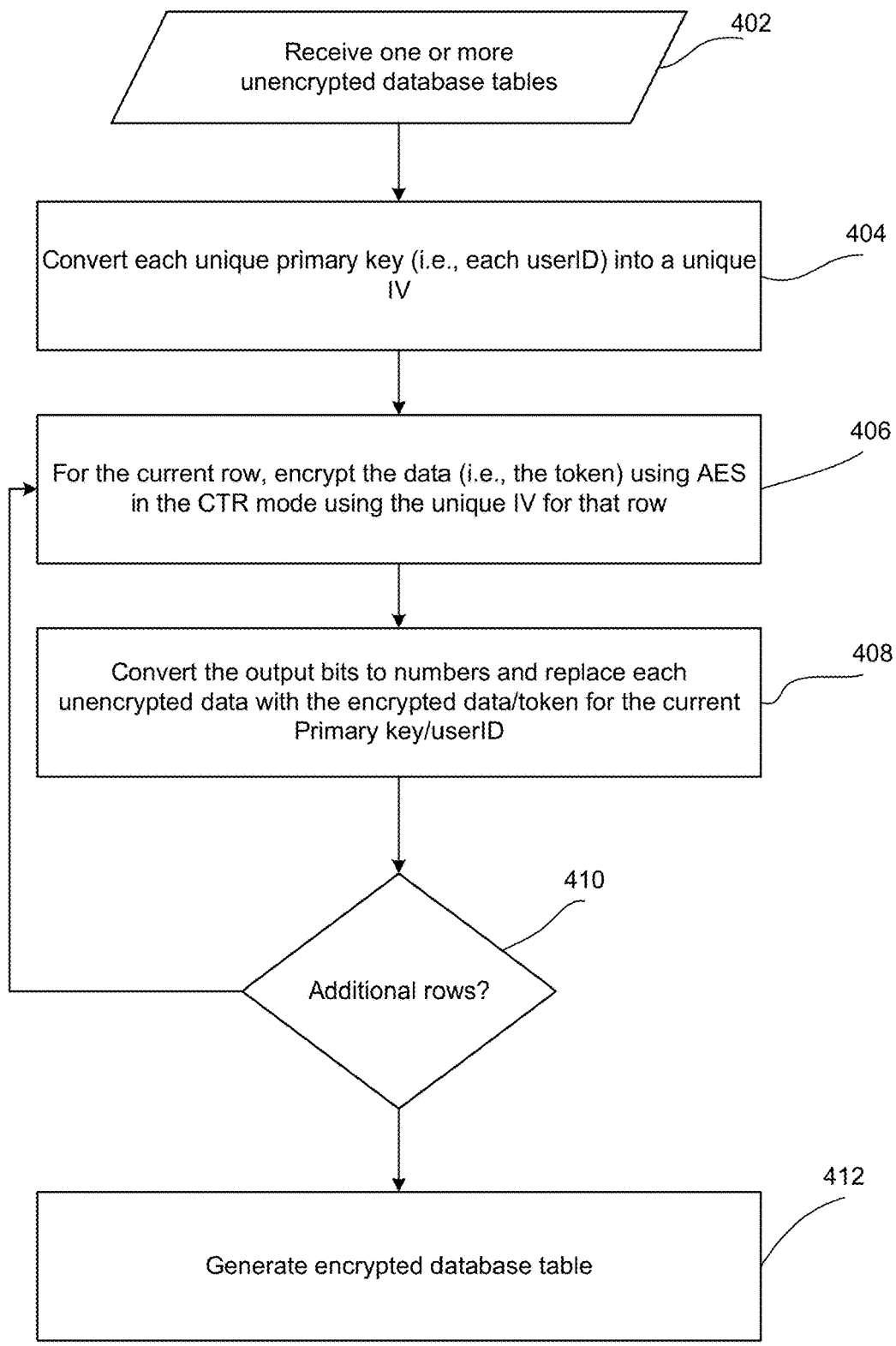
FIG. 4 is a flow diagram of the functionality of the length-preserving encryption module of FIG. 2 for encrypting database table data while preserving the length, in accordance with one embodiment.

FIG. 4 is a flow diagram of the functionality of length-preserving encryption module 16 of FIG. 2 for encrypting database table data while preserving the length, in accordance with one embodiment. The functionality of FIG. 4 in embodiments receives as input a database table having one or more columns of unencrypted data, and then outputs the database table with the data now being encrypted while preserving the length of the unencrypted data. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, the one or more database tables are received. A database table is a collection of related data held in a table format within a database. It includes columns/fields and rows/records. In relational databases, and flat file databases, a table is a set of data elements (values) using a model of vertical columns (identifiable by name) and horizontal rows, with a cell being the unit where a row and column intersect. A database table/file has a specified number of columns, but can have any number of rows, and includes a plurality of database records. Each row is uniquely identified by one or more values/keys appearing in a particular column subset. A specific choice of columns which uniquely identify each row is called the primary key.

Figure 5A:
FIG. 5A illustrates a simplified example relational database table that can be used as an input in accordance to embodiments.

FIG. 5A illustrates a simplified example relational database table 510 that can be used as an input at 402 in accordance to embodiments. Database table 510 includes two columns/fields, a "userID" column 511 that functions as the primary key and includes non-sensitive data that does not need to be encrypted, and a "token" column 512 which includes sensitive data that needs to be encrypted. The goal of the functionality of FIG. 4 is to encrypt the data in the token column while keeping the output length (in bits) the same as the input length.

At 404, each unique primary key (i.e., each userID) is converted into a unique IV. Since primary keys of a database table may be non-numeric strings, the strings need to be converted integers, since the IV is always an integer/numerical. Any type of standard conversion can be used. For example, an ASCII table can be used to convert ASCII characters into integers.

At 406, for the current row, the data (i.e., the token) in encrypted using AES in the CTR mode using the unique IV for that row. Any approved library can be used, without making any change to the implementation. In one embodiment, the library could be Oracle Java Cryptography classes that offer encryption capabilities. Embodiments do not require any change to the existing libraries such as Oracle Java. The Java Cryptography application programming interface ("API") enables encryption and decryption of data in Java, as well as managing keys, sign and authenticate messages, calculate cryptographic hashes, etc.

At 408, the output bits are converted into numbers and each unencrypted data is replaced with the encrypted data/token for the current Primary key/userID. In embodiments, SQL queries may have to be adjusted to handle special characters using the hex value, for example. At run-time, the encryption columns have to be decrypted.

At 410, it is determined if additional rows remain to be encrypted. If yes, the next row (or any other row) is selected and functionality continues at 406 for the new "current" row. Otherwise, the encrypted database table has been generated at 412 In other embodiments, rather than encrypting row by row, different rows can be encrypted in parallel because the primary key of each record/row is unique.

Figure 5B:
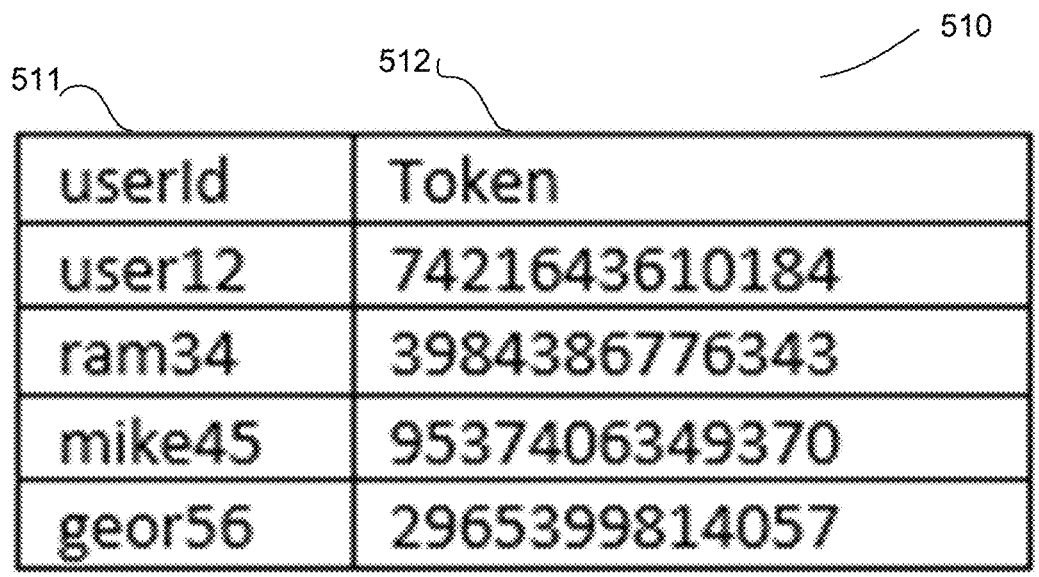
FIG. 5B illustrates the relational database table from FIG. 5A after the functionality of FIG. 4 in accordance to embodiments.

FIG. 5B illustrates relational database table 510 from FIG. 5A after the functionality of FIG. 4 in accordance to embodiments. As shown, all data in the token field 512 is now encrypted.

Although the example shown in FIGS. 5A and 5B only involves encrypting a single column 512, embodiments can encrypt multiple columns at once because of the use of the CTR mode of encryption. The length of all the columns are preserved in this process. If some intermediate columns need not be encrypted, embodiments can ignore the encrypted bytes corresponding to the non-sensitive columns.

Embodiments further include functionality to decrypt database tables (i.e., using database table 510 of FIG. 5B as input, and then outputting database table 510 of FIG. 5A. The decryption process is the same as the encryption process because embodiments are using the CTR mode. During decryption embodiments convert the userID into IVs for each row. Therefore, IVs are not stored anywhere.

Counter Collisions

Embodiments have a need to avoid IV collisions while using the CTR mode using the primary key as the IV. As disclosed, because embodiments use the CTR mode, it is important that no two blocks are encrypted using the same IV and key pair. Otherwise, the approach is insecure. With the CTR mode, the counter value is encrypted using a random function to produce the keystream. The keystream has to be unique. To achieve a uniqueness of the keystream, embodiments apply cryptographic hash functions as follows.

Case 1: If at most 128-bits of data per row of a table is encrypted, embodiments convert the primary key into the IV. This conversion is secure because the primary key is unique for each record. Therefore, embodiments implement a unique IV.

Case 2: If more than 128-bits of data per row of a table is encrypted, embodiments generate an IV using hash (primarykey), where the primaryKey is the primary key string. The hash function can be SHA-256, SHA-3, or any approved equivalent function. Embodiments select, for example, the first 16 bytes from the output of the hash function because the IV length is 16-byte for modern cipher modes. The reason a hash function is applied is that embodiments obtain a random output from cryptographic hash functions. Therefore, embodiments avoid collisions of the counter value and hence all keystreams are unique—an important precondition for the CTR mode.

With embodiments, the primary key does not have to be a secret. Therefore, if attackers can control the value of the primary key value for some of their database records, they cannot cause collision (in polynomial time) of the counter values unless they break well-established hash functions.

One embodiment is a method (or computer readable medium or database management system) of encrypting data of a database table. The method includes receiving the database table, the database table comprising a plurality of rows, each row comprising a unique primary key and at least one column of unencrypted data, converting each unique primary key into a unique initialization vector (IV), for a current row, encrypting the unencrypted data using a corresponding unique IV for the row, the encrypting comprising length-preserving encryption, and within each column, replacing the unencrypted data with the encrypted data.

The encrypting the unencrypted data includes using the corresponding unique IV for the row using Advanced Encryption Standard ("AES") in a Counter Mode ("CTR") mode. The converting includes converting non-numeric strings into integers. The encrypting can an encryption Java library.

The database table includes a relational database table. The method further including preserving a length of each column and further including avoiding IV collisions including: when at most 128-bits of data per row of a table is encrypted, converting the primary key into the IV; when more than 128-bits of data per row of a table is encrypted, generating the IV using hash (primarykey), where primaryKey is a primary key string.

The method further including not separately storing the unique IV and not invoking AES multiple times to encrypt one block of data.

As disclosed, embodiments leverage the primary keys of database tables as initialization vectors for cipher modes such as CTR and GCM. Embodiments do not require any additional storage to store initialization vectors and tweaks. In comparison to known FFX schemes, embodiments are secure against chosen-plaintext attack because embodiments use the standard CTR mode, which protects the confidentiality of the data. Further, In comparison to known FFX schemes, embodiments are efficient because embodiments do not invoke AES multiple times to encrypt one block of data. This is because embodiments directly use the CTR mode to preserve the length but not the format of the data.

In some embodiments, there may not be a requirement for length-preservation. Therefore, embodiments that use the primary key of a database table under encryption can also be used with other cipher modes, other than CTR, that require a unique IV, but not necessarily a random IV. For example, the GCM mode, which offers both confidentiality and integrity, can also be implemented by converting the database table primary keys into counters/IVs, without using additional storage. However, because GCM is not length-preserving, this embodiment can only be used in the context where the length of the encrypted fields can be modified.

Further, embodiments are agnostic to any particular database technology. For example, embodiments can be applied to comma-separated values ("CSV") files by encrypting one or more columns of a CSV file, without increasing the file size.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of encrypting data of a database table comprising:
   receiving the database table, the database table comprising a plurality of rows, each row comprising a unique primary key that uniquely identifies each row of the database table and at least one column of unencrypted data;
   converting each unique primary key into a unique numerical initialization vector (IV);
   for a current row, encrypting the unencrypted data of each column using the corresponding converted unique numerical IV for the row, the encrypting comprising length-preserving encryption; and
   within each column, replacing the unencrypted data with the encrypted data.

2. The method of claim 1, the encrypting the unencrypted data using the corresponding unique IV for the row using Advanced Encryption Standard (AES) in a Counter Mode (CTR) mode.

3. The method of claim 2, further comprising avoiding IV collisions comprising:
   when at most 128-bits of data per row of a table is encrypted, converting the primary key into the IV;
   when more than 128-bits of data per row of a table is encrypted, generating the IV using hash (primarykey), where primaryKey is a primary key string.

4. The method of claim 2, further comprising not separately storing the unique IV and not invoking AES multiple times to encrypt one block of data.

5. The method of claim 1, the converting comprising converting non-numeric strings into integers.

6. The method of claim 1, the encrypting using an encryption Java library.

7. The method of claim 1, wherein the database table comprises a relational database table.

8. The method of claim 1, further comprising preserving a length of each column.

9. A non-transitory computer readable medium having instructions stored thereon that, when executed by one or more processors, cause the processors to encrypt data of a database table, the encrypting comprising:

receiving the database table, the database table comprising a plurality of rows, each row comprising a unique primary key that uniquely identifies each row of the database table and at least one column of unencrypted data;

converting each unique primary key into a unique numerical initialization vector (IV);

for a current row, encrypting the unencrypted data of each column using the corresponding converted unique numerical IV for the row, the encrypting comprising length-preserving encryption; and within each column, replacing the unencrypted data with the encrypted data.

10. The computer readable medium of claim 9, the encrypting the unencrypted data using the corresponding unique IV for the row using Advanced Encryption Standard (AES) in a Counter Mode (CTR) mode.

11. The computer readable medium of claim 10, the encrypting further comprising avoiding IV collisions comprising:

when at most 128-bits of data per row of a table is encrypted, converting the primary key into the IV;

when more than 128-bits of data per row of a table is encrypted, generating the IV using hash (primarykey), where primaryKey is a primary key string.

12. The computer readable medium of claim 10, further comprising not separately storing the unique IV and not invoking AES multiple times to encrypt one block of data.

13. The computer readable medium of claim 9, the converting comprising converting non-numeric strings into integers.

14. The computer readable medium of claim 9, the encrypting using an encryption Java library.

15. The computer readable medium of claim 9, wherein the database table comprises a relational database table.

16. The computer readable medium of claim 9, the encrypting further comprising preserving a length of each column.

17. A database management system comprising:

a database table comprising a plurality of rows, each row comprising a unique primary key that uniquely identifies each row of the database table and at least one column of unencrypted data;

a database table encryption module comprising one or more processors that execute instructions to:

convert each unique primary key into a unique numerical initialization vector (IV);

for a current row, the unencrypted data of each column using the corresponding converted unique numerical IV for the row, the encrypting comprising length-preserving encryption; and within each column, replace the unencrypted data with the encrypted data.

18. The database management system of claim 17, the encrypting the unencrypted data using the corresponding unique IV for the row using Advanced Encryption Standard (AES) in a Counter Mode (CTR) mode.

19. The database management system of claim 18, the database table encryption module not separately storing the unique IV and not invoking AES multiple times to encrypt one block of data.

20. The database management system of claim 17, the database table encryption module preserving a length of each column.

* * * * *